United States Patent
Fujiwara et al.

(10) Patent No.: US 6,246,815 B1
(45) Date of Patent: Jun. 12, 2001

(54) GRATING ELEMENT, LIGHT WAVELENGTH SELECTION UTILIZING THE SAME, AND OPTICAL SIGNAL TRANSMITTING SYSTEM

(75) Inventors: Takumi Fujiwara; Akira Ikushima, both of Nagoya (JP)

(73) Assignees: Toyota Jidosha Kabushiki Kaisha, Toyota; Toyota School Foundation, Nagoya, both of (JP)

( * ) Notice: Subject to any disclaimer, the term of this patent is extended or adjusted under 35 U.S.C. 154(b) by 0 days.

(21) Appl. No.: 09/242,291
(22) PCT Filed: Aug. 11, 1997
(86) PCT No.: PCT/JP97/02808
  § 371 Date: Feb. 11, 1999
  § 102(e) Date: Feb. 11, 1999
(87) PCT Pub. No.: WO98/07064
  PCT Pub. Date: Feb. 19, 1998

(30) Foreign Application Priority Data

Aug. 12, 1996 (JP) .................................................. 8-212323
Sep. 17, 1996 (JP) .................................................. 8-244966

(51) Int. Cl.[7] .................................................. G02B 6/34
(52) U.S. Cl. .................. 385/37; 385/40; 385/49
(58) Field of Search .................. 385/10, 37, 24, 385/49, 14, 129, 130, 147; 359/240, 241, 245; 250/227.18, 227.23

(56) References Cited

U.S. PATENT DOCUMENTS

| | | |
|---|---|---|
| 4,474,427 | 10/1984 | Hill et al. . |
| 4,725,110 | 2/1988 | Glenn et al. . |
| 4,807,950 | 2/1989 | Glenn et al. . |
| 5,104,209 | 4/1992 | Hill et al. . |
| 5,127,928 | 7/1992 | Farries et al. . |
| 5,235,659 | 8/1993 | Atkins et al. . |
| 5,287,427 | 2/1994 | Atkins et al. . |
| 5,327,515 | 7/1994 | Anderson et al. . |
| 5,367,588 | 11/1994 | Hill et al. . |
| 5,478,371 | 12/1995 | Lemaire et al. . |
| 5,617,499 | 4/1997 | Bruech et al. . |
| 5,696,233 | 12/1997 | Evans et al. . |
| 5,828,059 | * 10/1998 | Udd .................................. 250/227.18 |
| 5,966,233 | * 10/1999 | Fujiwara et al. ...................... 359/240 |

FOREIGN PATENT DOCUMENTS

| | | |
|---|---|---|
| 714 182 | 5/1996 | (EP) . |
| 3-504772 | 10/1991 | (JP) . |
| 4-132427 | 5/1992 | (JP) . |
| 7-191210 | 7/1995 | (JP) . |
| 7-218712 | 8/1995 | (JP) . |
| 8-223137 | 8/1996 | (JP) . |
| 90/08970 | 8/1990 | (WO) . |
| 96/16344 | 5/1996 | (WO) . |

OTHER PUBLICATIONS

Optical Fiber Communication '95 Technical digest vol. 8 Postconference Edition, (Mar. 1995), T. Fujiwara et al., "UV–ecited poling and electrically tunable bragg gratings in a germanosilicate fiber" pp. 347–350.

Electro–Optic modulation in germanosilicate fibre with UV–excited poling, T.Fujiwara.Electronics Letters Mar. 30, 1995, vol. 31, No. 7,pp. 573–574.

* cited by examiner

Primary Examiner—Frank G. Font
Assistant Examiner—Sang H. Nguyen
(74) Attorney, Agent, or Firm—Pillsbury Winthrop LLP

(57) ABSTRACT

A core section (10a) is formed in an optical fiber (10) made of a glass material and, electrodes (14a and 14b) are inserted into the clad section (10b) of the fiber (10). When the core section (10a) is irradiated with ultraviolet rays in prescribed intensity patterns while a high voltage is applied to the electrodes (14a and 14b), a grating section (16) in which non linear areas (16a) and normal areas (16b) are alternately formed is formed in the section (10a). The characteristics of the grating section (16) can be changed by utilizing an electrooptic effect by impressing a prescribed electric field upon the section (16) through the electrodes (14a and 14b). A grating element constituted in such a way can be utilized as an optical functional element, such as the wavelength switch, because the Bragg wavelength of the element changes when a voltage is applied.

8 Claims, 8 Drawing Sheets

ULTRA-VIOLET RAYS

CONFIGURATION OF THE SYSTEM

GRATING ELEMENT, LIGHT WAVELENGTH SELECTION UTILIZING THE SAME, AND OPTICAL SIGNAL TRANSMITTING SYSTEM

This application is the national phase of international application PCT/JP97/02808 filed Aug. 11, 1997 which designated the U.S.

FIELD OF THE INVENTION

The present invention relates to a method of manufacturing a grating element having a linear (first-order) electro-optic effect, and to a grating element. The present invention also relates to a light wavelength selective device and method and to an optical signal transmitting system utilizing a grating section to which optical non-linearity is periodically imparted. More specifically, the present invention relates to a grating element utilizing a glass fiber.

BACKGROUND OF THE INVENTION

With the recent progress in telecommunication technologies utilizing computers and the like, there is an ever-increasing need for large-volume information transmission. One of the most important means for transmitting such large-volume information are optical fibers. In optical fiber based transmission, optical signals are transmitted through an optical fiber. The optical fiber is formed of a glass material because of its advantages such as transmitting a wide range of wavelengths, having a high transparency, suited for manufacturing a long fiber, and being cost-effective.

Construction of an optical fiber transmission system requires elements such as a light source, an optical receiver, an optical signal generator, an optical switch/coupler, and an optical connector for connection with a transmission optical fiber. The electro-optic effect (optical non-linearity) is utilized especially for optical switching elements such as the optical signal generator and the optical switch. The optical non-linearity is generated by non-linear polarization induced in material by light (electromagnetic waves), and intensity and direction of light transmitted through the optically non-linear material is changed by controlling factors such as electric field strength applied to the material. By use of such optical non-linearity, various optical functional elements such as optical switching elements are formed.

Further, the light introduced to the optical fiber is switched on/off by such optical functional elements based on the information to be transmitted, to thereby achieve light modulation. The optical signals are then demodulated at the receiving side, completing transmission of information through the optical fiber.

A plurality of information items can simultaneously be transmitted if light beams of a plurality of wavelengths are guided through the optical fiber. If information is transmitted at different points in time, distinction between the different information items can surely be made by utilizing different wavelengths. Therefore, a need exists for guiding light beams of a plurality of wavelengths through a single optical fiber.

In conventional optical transmission systems, a wavelength of light is basically selected by an optical filter, and isolation of a prescribed wavelength requires a separate filter. A conventional optical switch is designed to switch on or off a light beam of a single wavelength, but not to switch light beams of a plurality of wavelengths. Therefore, if light of a plurality of wavelengths is introduced, wavelength switches are provided for the respective wavelengths.

However, for transmitting light of a plurality of wavelengths through a single optical fiber, or for the means for collectively handling and switching light beams of a plurality of wavelengths, selecting and handling light beams of a plurality of wavelengths would be extremely advantageous and contribute to realizing a simplified system. Therefore, an optical functional element which allows selecting and handling light of a plurality of wavelengths is desired.

Crystalline material such as $LiNbO_3$ and $BaTiO_3$ are used as the optically non-linear material for implementing such optical functional element because currently the crystalline material is the only material that presents sufficient optical non-linearity.

Meanwhile, it is desirable to use glass material to form optical functional elements such as optical switches in terms of a stable connection with a glass optical fiber, low loss of the transmitted light, low cost, and a wide range of transmitting wavelengths. However, glass material basically does not have optical non-linearity and, therefore, cannot be used for this purpose.

Attempts to introduce optical non-linearity to a glass material have been made. For example, UV-excited poling carried out by irradiating a glass material with ultra-violet radiation while applying a high electric field of approximately $10^6$ V/cm is disclosed in "ELECTRONICS LETTERS $30^{th}$," March 1995, Vol. 31, No. 7, pp. 573–574.

UV-excited poling is believed to provide glass material with similar optical non-linearity to crystalline material, allowing the glass material to be suitably employed in optical functional elements.

A grating element is a known element utilizing an optical fiber having a core where portions with different refractive indices are formed. In a grating element, wavelengths of transmitted light and reflected light are varied with intervals in the grating. The grating element is used for devices such as temperature sensors.

Proposals have been made to form grating elements by irradiating a glass optical fiber having a core doped with germanium (Ge) with ultra-violet rays in a prescribed intensity pattern. According to this method, prescribed ultra-violet radiation is irradiated to change the refractive index at the irradiated portion, and thereby form a refractive index grating in the optical fiber. Fabrication of such grating element is proposed in, for example, JP-T2-62-500052.

As described above, the UV-excited poling method conventionally proposed can impart non-linearity to the glass material. However, this method imparts optical non-linearity only to a certain range of the optical fiber core, and therefore it only suggests its possibility of its application as an optical functional element.

In addition, the above conventional grating element has a grating which exhibits a change in refractive index. As a result, such a grating element does not have optical non-linearity and cannot form a variety of elements that utilize electro-optical effects.

Fabrication of grating elements by utilizing UV-excited poling is proposed in "Optical Fiber Communication Conference; OFC '95 Postdeadline Paper PD6," published in 1995. This document, however, only makes a general proposal on forming a grating element by utilizing UV-excited poling, and does not specifically disclose the formation.

SUMMARY OF THE INVENTION

The present invention has been made in view of the above-described problems and aims to provide a method of manufacturing a grating element utilizing glass material suitable for use in optical switches, and such grating element and a wavelength switch.

The present invention also aims to provide a wavelength selective device and method and an optical transmission system that employ glass material and allow a easy selection to be made among light beams of a plurality of wavelengths.

In a method of manufacturing a grating element according to the present invention, a poling process is performed by irradiating a plurality of regions of a glass optical waveguide with ultra-violet radiation at prescribed intervals while applying a prescribed electric field to change refractive indices at the UV-irradiated regions and impart optical non-linearity to the regions, thereby periodically forming regions with optical non-linearity at the optical waveguide to manufacture a grating element.

By thus irradiating with ultra-violet light and applying an electric field, a UV-excited poling process can be performed to change the refractive index of glass material and impart optical non-linearity to these regions. Since irradiation of ultra-violet radiation is directed to a plurality of regions at intervals, optically non-linear regions can be repetitively formed at the optical waveguide. As a result, when light is transmitted through the thus obtained optical waveguide, the Bragg reflection occurs due to different refractive indices at the optically non-linear regions and the other regions, to thereby block transmittance of light of the Bragg wavelength. In addition, because of the imparted optical non-linearity, the Bragg wavelength is shifted by application of a voltage. The thus obtained grating element can be advantageously used as a wavelength switch or a light selective device.

According to the present invention, the glass optical waveguide is a core section surrounded by a clad section of a glass optical fiber, and the above poling process is performed by irradiating the core section with ultra-violet rays in a periodic intensity in a direction perpendicular to light propagation.

Thus, a grating which exhibits the Bragg reflection can be formed at the core section.

A feature of the grating element according to the present invention lies in that optical non-linearity of 1 pm/V or greater is periodically imparted as an electro-optic coefficient to the core section of the glass optical fiber at intervals.

Another feature of the grating element according to the present invention lies in that a pair of electrodes are formed sandwiching the core section of the optical fiber.

A wavelength switch according to the present invention can apply a prescribed voltage across the pair of the electrodes of the grating element and control such application of the voltage across the electrodes to switch on/off the light propagating through the core section.

In such a grating element, the refractive index of the region with the imparted optical non-linearity varies with application of a voltage. Since the regions provided with optical non-linearity are alternately formed, the light transmitted through the core section undergoes the Bragg reflection. As a result, the Bragg wavelength of the transmitted light is changed by application of a voltage. Especially, according to the present invention, the electro-optic coefficient is as high as 1 pm/V, so that a significant shift in the Bragg wavelength can be achieved by applying a practical voltage. Consequently, this grating element can control transmitted light by application of a voltage, suited for use as a wavelength switch.

Especially, the grating element and the wavelength switch of the present invention are obtained by imparting optical non-linearity to a glass optical fiber, providing such favorable effects as easy connection with an optical fiber, good transmittance of a wide range of wavelengths, and low cost.

The grating element according to the present invention includes a core section connected to an end of the grating element for guiding light propagating therethrough, and a connector section having one end connected to the pair of electrodes and the other end including a connecting electrode section outwardly extending in a radial direction.

Use of such a connector section allows easy application of a voltage across the electrodes which are included in the grating element. Since the propagation of light through the core section can be maintained, a wavelength switch and an optical fiber can be easily connected. Preferably, the connector section is formed of glass.

In a wavelength selective device according to the present invention, optical non-linearity is periodically imparted as an electro-optical coefficient to a glass fiber core section at prescribed intervals. The glass fiber includes a wavelength selective element where a pair of electrodes are formed sandwiching the core section, and voltage adjusting means for applying a desired voltage in an adjustable manner to the pair of electrodes in the wavelength selective element. In the device, light of a plurality of wavelengths is introduced to the wavelength selective element, and then light of a prescribed wavelength is supplied therefrom.

According to a wave length selecting method of the present invention, an optical non-linearity is periodically imparted as an electro-optic coefficient to a core section of a glass optical fiber at prescribed intervals, in which light beams of a plurality of wavelengths are introduced to a wavelength selective element having a pair of electrodes sandwiching the core section, and a voltage corresponding to the wavelength of the light to be selected is applied across the pair of electrodes of the wavelength selective element, to thereby obtain light of the selected wavelength.

In addition, according to an optical signal transmission system of the present invention, a plurality of optical signals obtained by modulating light beams of a plurality of wavelengths are transmitted through a single optical fiber, and the above wavelength selective device selects an optical signal of a specific wavelength from the plurality of optical signals thus transmitted through the fiber, followed by demodulation of the thus derived optical signal.

According to the present invention, the voltage across the electrodes of the wavelength selective element is adjusted by voltage adjusting means, to thereby change the refractive index of the portion of the core section having the imparted optical non-linearity. The regions with optical non-linearity are periodically (alternately) formed, to thereby cause the Bragg reflection of the light transmitting through the core section. As a result, the Bragg wavelength of the transmitted (or reflected) light is altered by application of a voltage, so that light of a desired wavelength can be selected by adjusting the applied voltage.

Further, according to the present invention, the wavelength selective element is made of a glass material. Such wavelength selective element can be formed by UV-excited poling. More specifically, UV-excited poling process can be performed by irradiating with ultra-violet rays and applying an electric field, to thereby alter the refractive index of the glass material and impart optical non-linearity to the irradiated region. By irradiating a plurality of regions at intervals with ultra-violet rays, optically non-linear regions can be periodically formed at an optical waveguide.

According to the present invention, the optical waveguide is a core section surrounded by a clad section of a glass optical fiber, and the above poling process can be performed by irradiating the core section with ultra-violet rays in a periodic intensity in a direction perpendicular to the propagating direction of the light.

Preferably, the periodically imparted optical non-linearity has an electro-optic coefficient of at least 1 pm/V.

The wavelength selective element of the present invention is obtained by imparting optical non-linearity to the glass optical fiber, providing such favorable effects as being easily connected with the optical fiber, transmitting light of a wide range of wavelengths, and inexpensively fabricated.

With use of such a wavelength selective element, light of a predetermined wavelength can be easily selected, leading to an easy construction of a multiplexed optical communication system utilizing a plurality of wavelengths.

DETAILED DESCRIPTION OF THE PREFERRED EMBODIMENTS

A preferred embodiment of the present invention will now be described with reference to the drawings.

Figure 1:
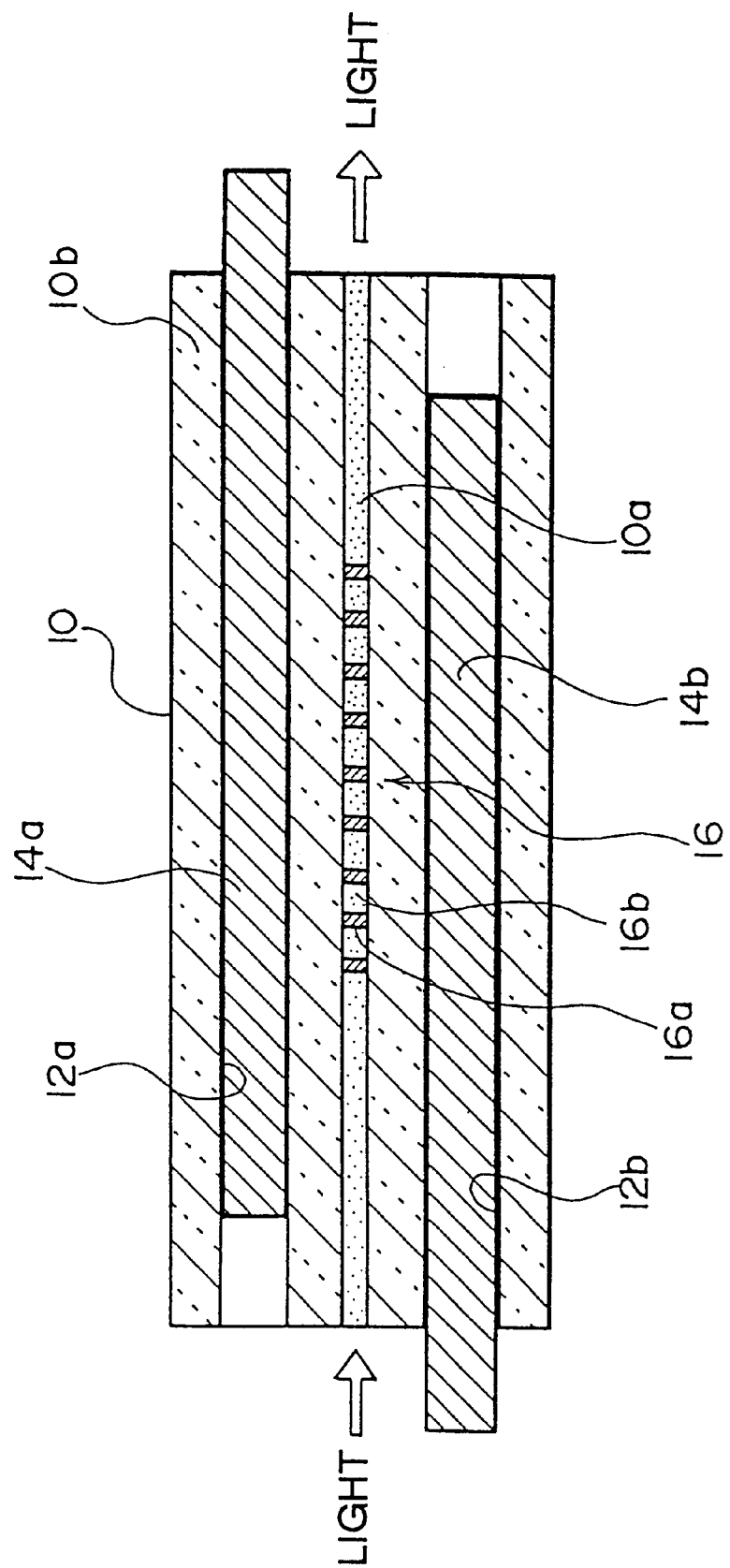
FIG. 1 is a front sectional view showing a structure of a grating element (wavelength selective element) according to an embodiment of the present invention.
Figure 2:
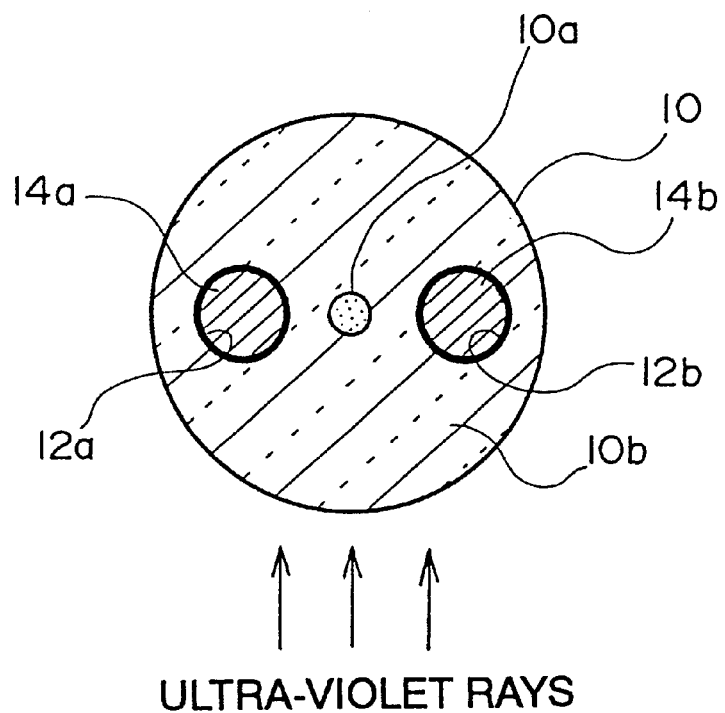
FIG. 2 is a side view showing a structure of the wavelength selective element of the embodiment.

FIGS. 1 and 2 are views schematically showing a structure of a grating element (which is a wavelength selective element in this example) according to the present invention. An optical fiber 10 formed of cylindrically drawn silica glass ($SiO_2$) and doped with, for example, germanium (Ge) includes a light conducting core section 10a located at its central portion where refractive index is adjusted, and a clad section 10b located at the surrounding portion.

A pair of side holes 12a and 12b are formed in the clad section 10b, and aluminum wire electrodes 14a and 14b are inserted therein. As can be seen from the figures, the electrodes 14a and 14b are provided opposing each other with the core section 10a interposed therebetween.

As shown in FIG. 1, the core section 10a includes a grating section 16 formed by non-linearity regions 16a, having a second-order optical non-linearity and a different refractive index and formed with a fixed width and fixed intervals therebetween in a direction perpendicular to the longitudinal direction, and normal regions 16b. As a result, light transmitted through the core section 10a in the longitudinal direction is reflected and interfered by the grating section 16.

Especially, according to this embodiment, the electrodes 14a and 14b are provided to which a desired voltage can be applied. The non-linearity region 16a of the grating section 16 has an optical non-linearity. Therefore, the refractive index is changed in accordance with the voltage applied between the electrodes 14a and 14b.

Accordingly, in the wavelength selective element of this embodiment, characteristics of the grating section 16 can be altered by controlling the voltage applied between the electrodes 14a and 14b.

[Manufacturing Method]

Such wavelength selective element is manufactured as follows. First, an optical fiber having the electrodes 14a and 14b inserted into the side holes 12a and 12b is prepared. The optical fiber has a diameter of 200 $\mu$m, the side holes 12a and 12b have a diameter of approximately 40 $\mu$m, the electrodes 14a and 14b have a diameter of approximately 40 $\mu$m and a length of approximately 4 cm and are located with a distance of 8–10 $\mu$m therebetween, and the optical fiber has a length of about 10 cm. As shown in FIG. 1, the electrodes 14a and 14b are inserted into the side holes 12a and 12b, respectively, from different ends, and each of the electrodes has an end protruding only in a direction different from each other, so as to prevent electric discharge between the electrodes. The dielectric breakdown voltage of air is about $10^4$ V/cm, and application of an electric field greater than this voltage to the core section 10a requires a longest possible path for air to invervene. The structure of the electrodes 14a and 14b shown in FIG. 1 allows one to achieve application of an electric field as high as approximately $10^6$ V/cm to the core section 10a.

A voltage of approximately 800 V is applied between the electrodes 14a and 14b, to thereby apply an electric field of approximately $10^6$ V/cm to the core section 10a. Under such circumstances, the core section 10a is irradiated with ultra-violet radiation using a pulsed ArF excimer laser (193 nm wavelength). The laser has an energy density of approximately 36 mJ/cm$^2$ and a pulse repetition rate of approximately 10 pps (pulse/second), and irradiating for a period of approximately 10–30 minutes.

Figure 3:
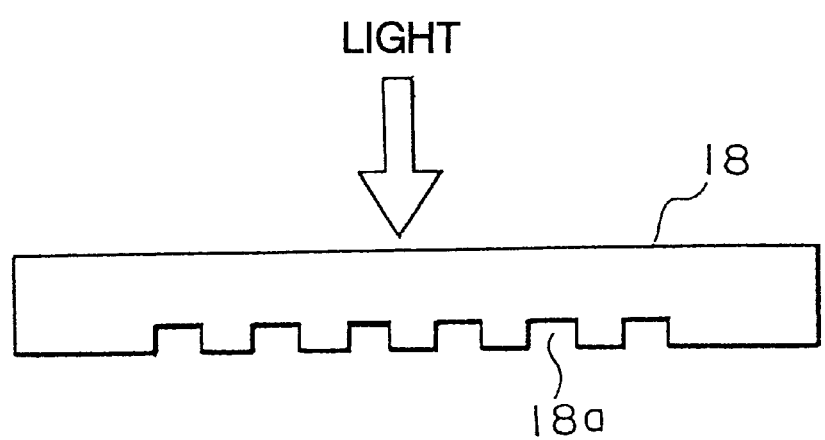
FIG. 3 is a view showing a structure of a phase mask.

The laser irradiates the optical fiber with a phase mask interposed therebetween. An exemplary structure of the phase mask is shown in FIG. 3. As shown, a multiplicity of grooves 18a are formed at one side of a substrate 18 in the form of a plate. The grooves 18a are formed in parallel at fixed intervals. As a result, parallel rays transmitting through the substrate 18 in the direction perpendicular to its surface cause a predetermined diffraction, with the light intensity repeating at prescribed intervals. In other words, a fringe pattern (a zebra pattern) is formed where irradiated regions and non-irradiated regions are periodically repeated. In this example, a laser irradiates the optical fiber at intervals of 1.05 $\mu$m. The substrate 18 of the phase mask is formed of silica glass or the like that allows transmission of ultra-violet rays.

The above-described application of an electric field is continued during laser irradiation. The optical fiber is formed so that only the core section 10a absorbs ultra-violet radiation due to doping of a prescribed element (such as germanium). As a result, the core section 10a is subjected to UV-excited poling at intervals of 1.05 $\mu$m.

Periodical increase in refractive index induced by UV-excited poling with use of the phase mask leads to a decrease in transmitted light (increase in reflected light) at the wavelength corresponding to the change in refractive index. The intensity of transmitted light is measured in real time at the side opposite the side where light is incident on the core section 10a, while UV-excited poling is continued for a desired time period (30 minutes in this example).

Figure 4A:
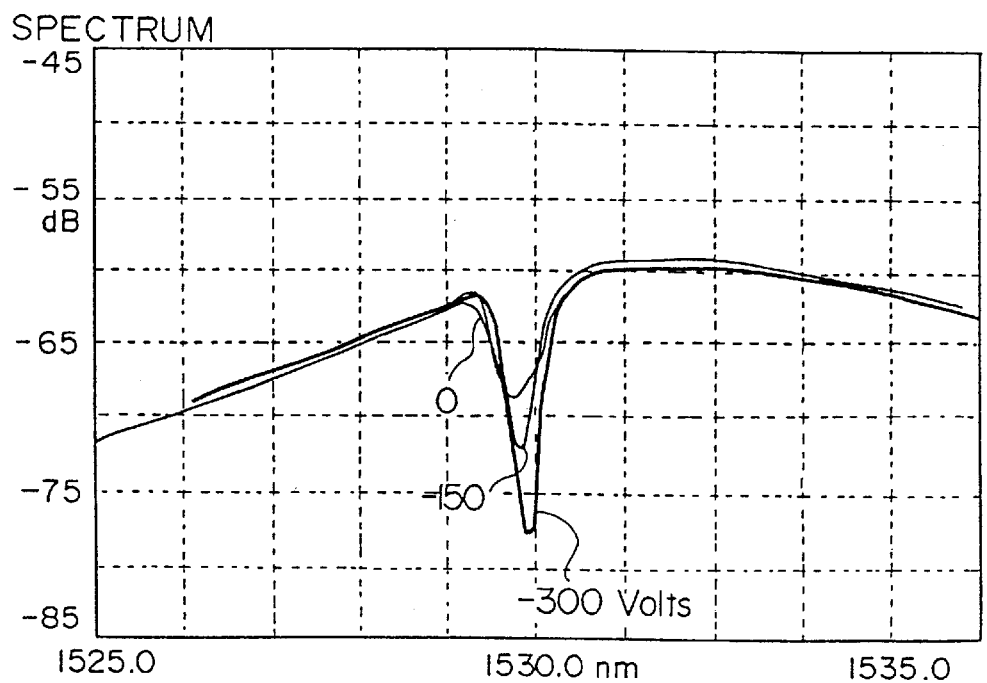
FIGS. 4A and 4B are graphs showing frequency characteristics of transmitted light varied with a change in an applied voltage.
Figure 4B:
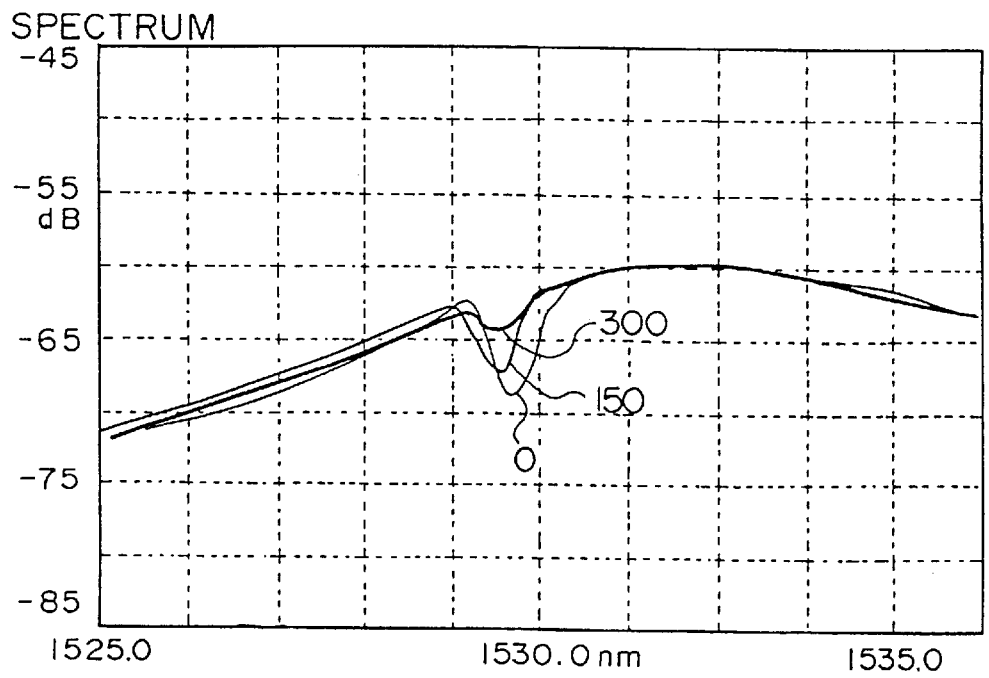

FIGS. 4A and 4B show results obtained by guiding light through the thus obtained wavelength selective element and measuring dependency of exiting light intensity on wavelength (spectrum of transmitted light). The wavelength selective element according to this embodiment includes the electrodes 14a and 14b with the core section 10 interposed therebetween for the purpose of UV-excited poling. A desired electric field can be applied to the core section 10a by applying a voltage between these electrodes 14a and 14b.

FIG. 4A shows the results obtained when voltages of 0 V, −150 V, −300 V are applied between the electrodes 14a and 14b, while FIG. 4B shows the results obtained when voltages of 0 V, 150 V, 300 V are applied. It should be noted that the sign of the voltage is defined here as the polarity opposite to that of the poling electric field being positive.

As shown in the above figures, light transmission intensity is decreased at a particular wavelength in this wavelength selective element because a grating with an interval of 1.05 μtm causes Bragg reflection in which light of the Bragg wavelength (1.53 μm in this example) is reflected.

Application of a voltage causes a shift in the Bragg wavelength, and the Bragg reflection increases or decreases in accordance with application of a voltage because the core section 10a of the UV-irradiated region attains non-linearity due to UV-excited poling to generate linear electro-optic effects and causes a change in effective refractive index of the guided light.

Especially, when a negative voltage is applied, a greater attenuation at the Bragg frequency is caused by the application of the voltage, exhibiting favorable reflection properties.

The change $\Delta n_{EO}$ in the refractive index induced by the electro-optic effect can be expressed as follows:

$$\Delta n_{EO} = -n^3 r E/2$$

where n is the refractive index of the fiber at the core region, r is the linear electro-optic coefficient, and E is the electric field strength.

The Bragg wavelength $\lambda_B$ can be expressed as follows:

$$\lambda_B = 2\Lambda n_{eff}$$

where $\Lambda$ is the pitch in the grating. In the concept based on coupling of forward and backward (reflected) guided light by the grating, the peak reflectance R can be expressed as:

$$R = \tanh^2(\kappa L)$$

3 dB bandwidth $\Delta\lambda$ can be expressed as:

$$\Delta\lambda = \lambda_B \{\pi^2 + (\kappa L)^2\}^{0.5}/2n_{eff}L$$

Where $\kappa$ is the coupling coefficient of the forward and backward (reflected) guided light, which can be expressed as:

$$\kappa = \pi n_c \delta n \eta / \lambda_B n_{eff}$$

where L is the length of the grating section.

In the above equation, $n_{eff}$ is the effective refractive index of the guided light in the grating section, $n_c$ is the refractive index of the clad section, δn is the magnitude of the change in refractive index forming a periodic structure, and η is the overlap integral in the forward and backward propagation modes.

Figure 5:
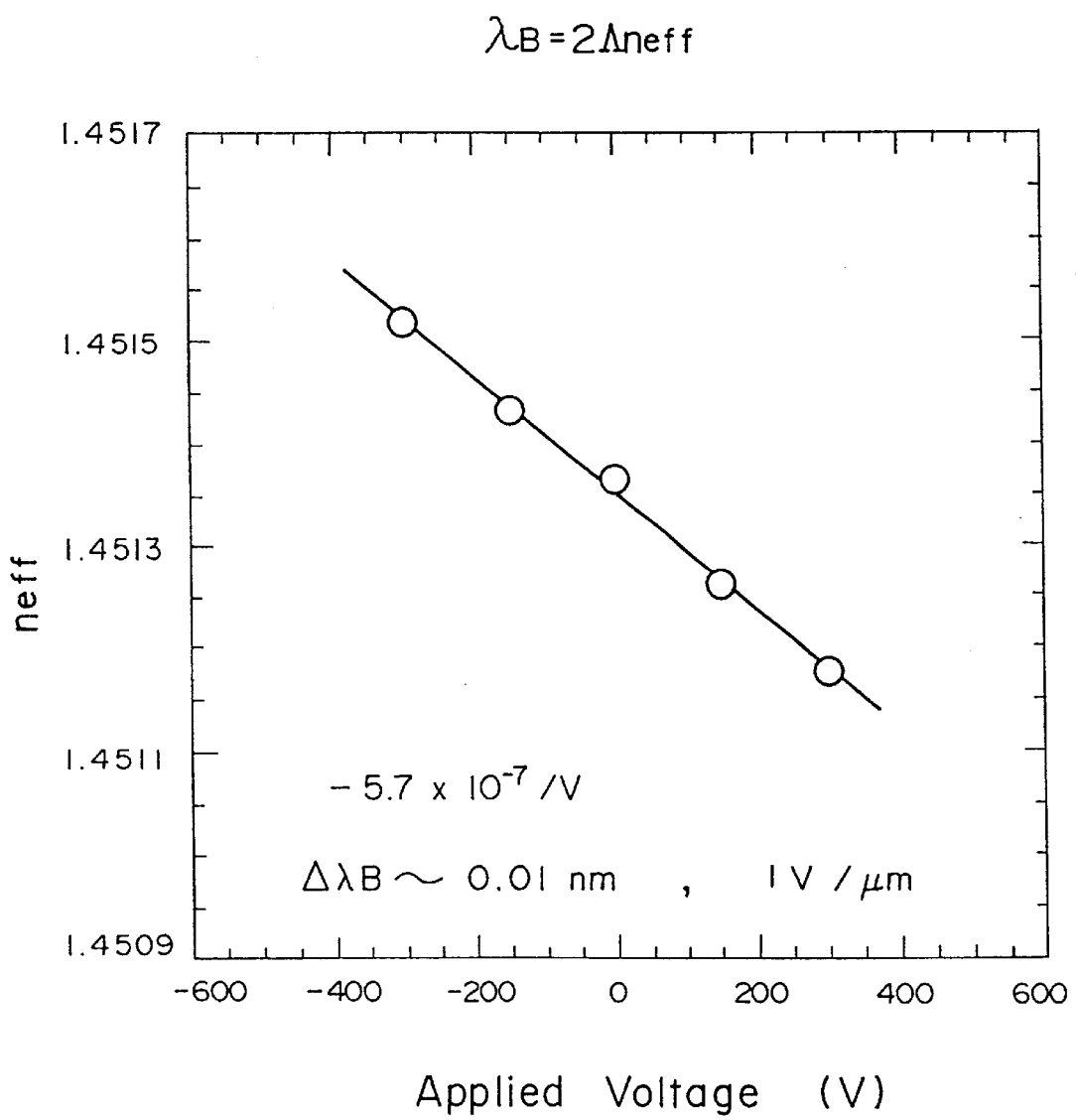
FIG. 5 is a graph showing the Bragg wavelength varied with a change in an applied voltage.

The values of $n_{eff}$, δn, and η vary with the value of $\Delta n_{EO}$. FIG. 5 shows the results obtained by examining the relation between the change $\Delta n_{EO}$ in the effective refractive index and the applied voltage based on the relationship between the change in the Bragg wavelength and the applied voltage shown in FIG. 4. As shown, the effective refractive index $n_{eff}$ has a slope of $-5.7 \times 10^{-7}$/V with respect to the change in the applied voltage, showing a linear change. This indicates that application of a voltage causes a drop in effective refractive index, leading to a shift in the Bragg wavelength toward shorter wavelengths. The change $\Delta\lambda_B$ in the Bragg wavelength relative to the electric field 1V/μm is approximately 0.01 nm.

As described above, a linear relationship exists between the applied voltage and the effective refractive index, demonstrating that Pockels effect (linear electro-optic effect) based on second-order optical non-linearity is achieved.

Figure 6:
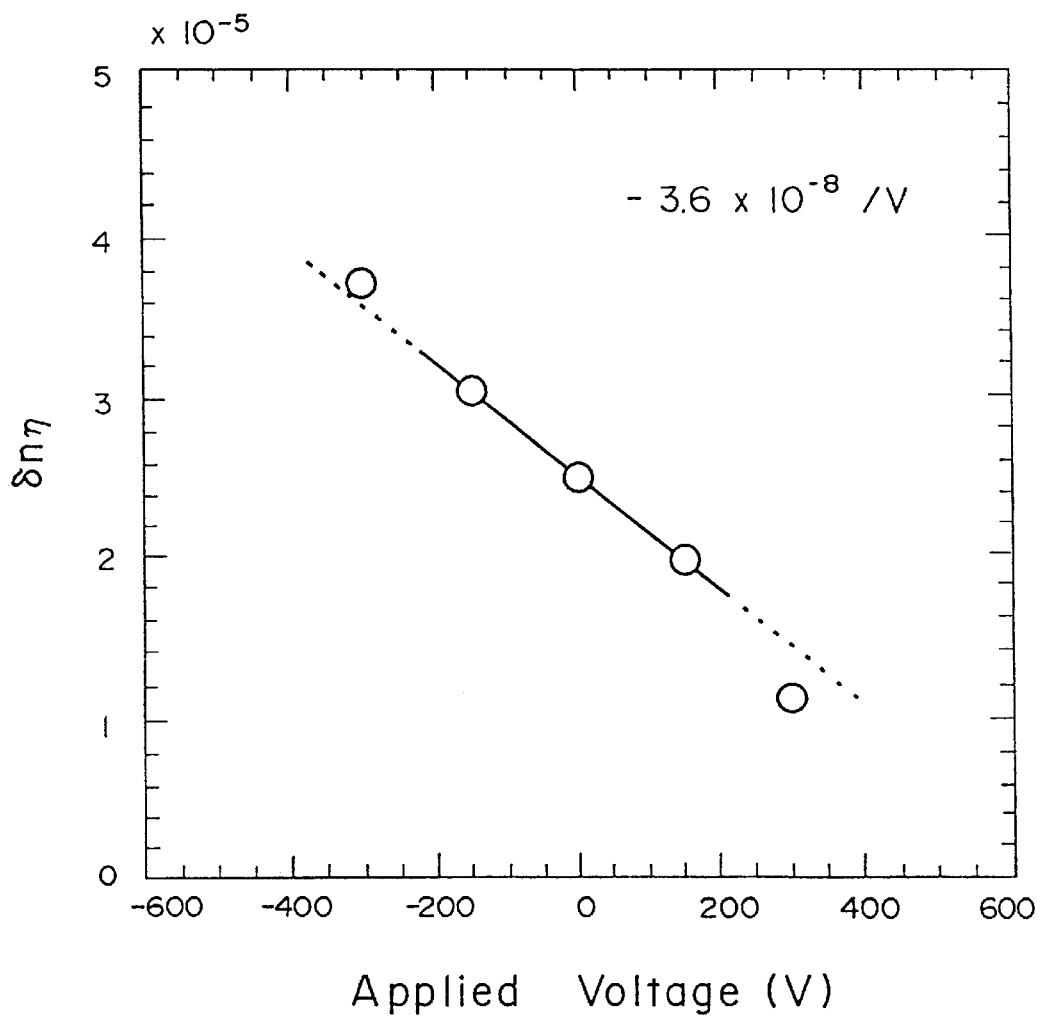
FIG. 6 is a graph showing variation in overlap integration with a change in an applied voltage.

FIG. 6 shows the relationship between the applied voltage and the value of δnη. As can be seen from the graph, the value of δnη has a slope of $-3.6 \times 10^{-6}$ with respect to the change in the applied voltage, which also proves the achievement of linear electro-optic effect.

As described above, in the wavelength selective element of this embodiment, reflection at the Bragg wavelength occurs in a narrow bandwidth as shown in FIG. 4. Especially, as shown in FIG. 4A, when the applied voltage is negative, the bandwidth is extremely narrow, with a minimum value of 0.04 nm. The Bragg wavelength greatly varies with application of a voltage. That is, as shown in FIG. 4A, an ON/OFF extinction ratio of approximately 10 dB can be obtained for the central wavelength 1.5299 μm by altering the applied voltage from 0 V to −300 V. As a result, the wavelength selective element of this embodiment makes it possible to select a light beam of a particular wavelength from a plurality of light beams of a plurality of wavelengths, to select and transmit a light beam of a particular wavelength, and to prohibit transmission of a light beam of a particular wavelength. Therefore, this wavelength selective element can function as an optical wavelength switch or an optical modulator.

Thus, light beams of prescribed wavelengths can be switched by applying a voltage to shift the Bragg wavelength and control whether or not to transmit laser light beams. Especially, the wavelength selective element of this embodiment is formed by a glass optical fiber, allowing an easy connection with a general optical fiber, and a sufficient light transmittance in the element can be maintained.

The Bragg wavelength can be shifted in a plurality of stages by applying a plurality of voltages, to thereby control the wavelength to transmit and achieve a function of a wavelength selective element.

Further, according to this embodiment, the interval in the grating can be easily adjusted by the phase mask, making it easy to obtain a wavelength selective element with a desired Bragg wavelength.

Figure 7:
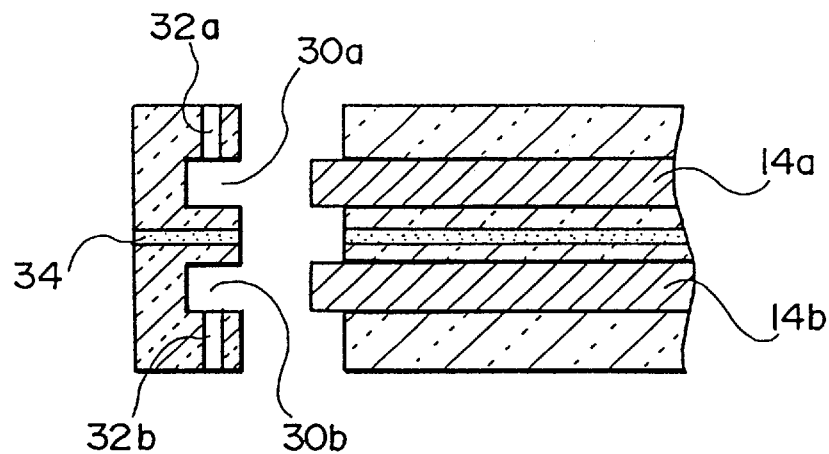
FIG. 7 is a view showing an example of a connector.

As shown in FIG. 1, since the electrodes 14a and 14b of the wavelength selective element of this embodiment include a protruded portion, a general optical fiber could not easily be connected to such an element with protruded electrodes. Therefore, it is preferable to provide a special connector that can receive the electrodes 14a and 14b and make a favorable connection with the core section 10a. For example, in FIG. 7, a connector having concave portions 30a and 30b for receiving the electrodes 14a and 14b can be used. If such connector is used, holes 32a and 32b may be provided in a radial direction reaching the concave portions 30a and 30b from the outside, to thereby make an electrical connection between the electrodes 14a and 14b and an external power supply. A core section 34 serving as an optical waveguide is provided also in the connector. Although the electrodes 14a and 14b protrude from the grating element in different directions as shown in FIG. 1, the electrodes 14a and 14b are movable within the side holes 12a and 12b, and can therefore be moved after the poling process.

Operation of the above-described wavelength switch or the like does not require application of a very high voltage, so a lead wire can be easily connected. More specifically, a direct electrical connection can be made using the protruding electrodes 14a and 14b for UV-excited poling, and, after the poling process, the electrodes 14a and 14b are moved and worked to a prescribed shape before attaching the connector.

Figure 8:
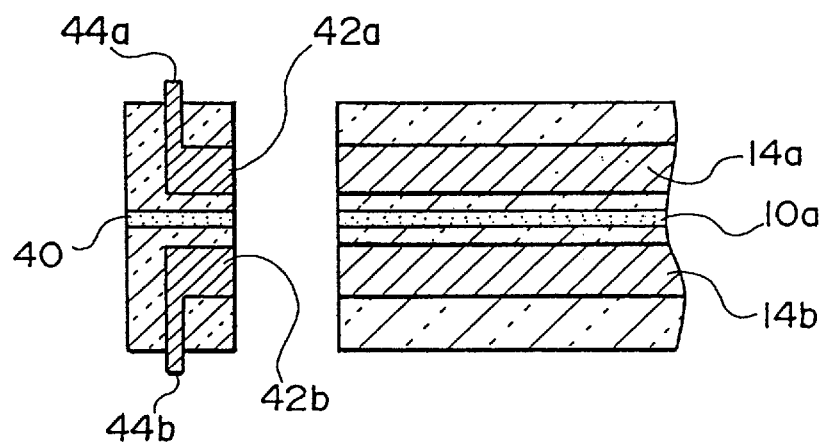
FIG. 8 is a view showing another example of a connector.

The protrusion of the electrodes 14a and 14b of the wavelength selective element can be polished to a flat surface so as to connect to a connector with a flat surface. For this option, referring to FIG. 8, a core section 40 and electrodes 42a and 42b are formed at the polished surface of the connector. The electrodes 42a and 42b have outwardly extending terminal sections 44a and 44b, which can be used for an electrical connection with the external power supply.

The connector has a configuration such that an optical fiber can be connected also at the side opposite to the side receiving the wavelength selective element, so that the wavelength selective element can be connected to another optical fiber through this connector. The electrical connection with the electrodes 14a and 14b can be easily made using holes 32a and 32b and terminals 44a and 44b.

Figure 9:
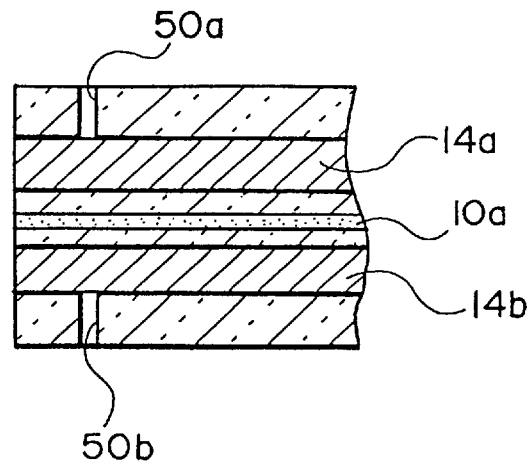
FIG. 9 is a view showing a still another example of a connector.

In FIG. 9, holes 50a and 50b can be provided in the waveguide selective element to make a direct electrical connection to the electrodes 14a and 14b. For this option, the end surface of the waveguide selective element is polished so as to directly connect to another optical fiber, as in the option described with reference to FIG. 8.

The above-described construction can secure the connection between the electrodes 14a and 14b and the external power supply.

[Overall Configuration of the System]

Figure 10:
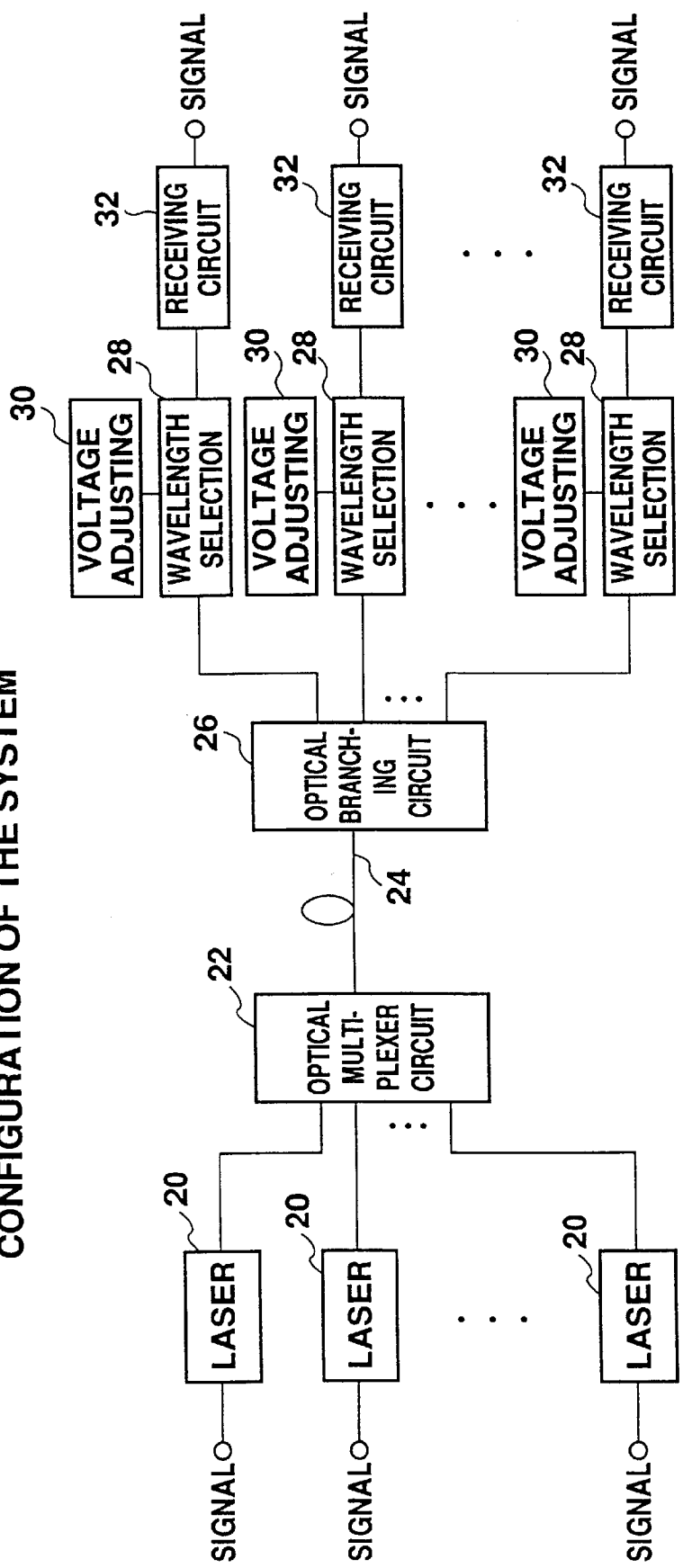
FIG. 10 is a diagram showing a configuration of an optical signal transmitting system.

FIG. 10 shows a configuration of an optical signal transmission system. Each laser light source 20 is responsive to an input signal to provide a modulated signal. The laser light sources 20 each output an optical signal of a fixed wavelength different from each other. A plurality of optical signals of different wavelengths supplied from the plurality of laser light sources 20 are introduced to and multiplexed by an optical multiplexer circuit 22, and then transmitted through a single optical fiber 24.

The optical fiber 24 is connected to an optical branching circuit 26, which receives optical signals transmitted thereto through the optical fiber. The optical branching circuit 26 divides the input signals by a prescribed number, and supplies them to wavelength selective devices 28 at a plurality of receiving terminals.

Wavelength selective devices 28 are each connected to a voltage adjusting circuit 30 and an optical signal at a prescribed wavelength is selected in accordance with the voltage applied by the voltage adjusting circuit 30. More specifically, the wavelength selective device 28 has the above-described wavelength selective element so as to control the wavelength of the light to transmit by a change in voltage across the pair of electrodes of the wavelength selective element. As a result, an optical signal at a prescribed wavelength can be selected by adjusting the voltage output from the voltage adjusting circuit 30. The optical signal at the wavelength selected by the wavelength selective device 28 is supplied to a receiving circuit 32, which demodulates the signal.

As described above, because the present system includes a wavelength selective device 28, an optical signal modulated by any of the laser light sources 20 can be selected and demodulated by controlling the output voltage of the voltage adjusting circuit 30. Consequently, a signal can be efficiently selected at each terminal in the multiplexed optical transmission system. In addition, this wavelength selective device formed of glass material is inexpensive and very easily connected with an optical fiber. Thus, an efficient selection of an optical signal can be made at each of the receiving terminals.

INDUSTRIAL APPLICABILITY

An optical functional element such as an optical modulator for producing an optical signal can be implemented by using a grating element. As a result, an optical transmission system can be constructed by utilizing various optical functional elements in the optical transmission system.

What is claimed is:

1. A grating element, comprising:

a grating element section having a periodically imparted optical non-linearity of at least 1 pm/v as an electro-optic coefficient at prescribed intervals in a core section of a glass optical fiber;

a pair of electrodes formed to sandwich the core section of said optical fiber; and a connector section including a core section connected to an end of said grating element section for guiding light propagating through the core section of said optical fiber, and a connecting electrode section having one end connected to said pair of electrodes and the other end outwardly extending in a radial direction.

2. A grating element, comprising:

a grating element section having a periodically imparted optical non-linearity of at least 1 pm/V as an electro-optic coefficient at prescribed intervals in a core section of a glass optical fiber;

a pair of electrodes formed to sandwich the core section of said optical fiber and protruding from said optical fiber at one or both ends; and a connector section including a pair of concave portions connected to an end of said grating element section for receiving the protruded portion of said pair of electrodes, and a pair of holes for electrical connection between the concave portions and outside.

3. A grating element, comprising:

a grating element section having a periodically imparted optical non-linearity of at least 1 pm/V as an electro-optic coefficient at prescribed intervals in a core section of a glass optical fiber;

a pair of electrodes formed to sandwich the core section of said optical fiber, wherein said glass optical fiber defines a pair of holes in a radial direction of said glass fiber adapted to provide an electrical connection to said pair of electrodes.

4. The grating element according to any one of claims 1–3, wherein application of a voltage across said pair of electrodes in said grating element section is controlled so as to function as a wavelength switch for switching on/off light propagating through said core section.

5. The grating element according to any one of claims 1–3, wherein application of a voltage across said pair of electrodes in said grating element section is controlled so as to function as a wavelength selective element for selecting a light beam of a particular wavelength among light beams of a plurality of wavelengths incident on said core section.

6. An optical signal transmitting system for transmitting a plurality of optical signals obtained by modulating light beams of a plurality of wavelengths through a single optical fiber, and selecting an optical signal of a prescribed wavelength among a plurality of optical signals transmitted through the optical fiber by an optical wavelength selective device to demodulate the selected optical signal, said optical wavelength selective device including:

a grating element section having a periodically imparted optical non-linearity of at least 1 pm/V as an electro-optic coefficient at prescribed intervals in a core section of a glass optical fiber;

a pair of electrodes formed to sandwich the core section of said optical fiber;

a connector section including a core section connected to an end of said grating element section for guiding light propagating through the core section of said optical fiber, and a connecting electrode section having one end connected to said pair of electrodes and the other end outwardly extending in a radial direction; and voltage adjusting means for applying any voltage in an adjustable manner to said pair of electrodes in said grating element section by using the connecting electrode section of said connector section; wherein light beams of a plurality of wavelengths are introduced to said wavelength selective device to obtain light of a prescribed wavelength.

7. An optical signal transmitting system for transmitting a plurality of optical signals obtained by modulating light beams of a plurality of wavelengths through a single optical fiber, and selecting an optical signal of a prescribed wavelength among a plurality of optical signals transmitted through the optical fiber by an optical wavelength selective device to demodulate the selected optical signal, said optical wavelength selective device including:

a grating element section having a periodically imparted optical non-linearity of at least 1 pm/V as an electro-optic coefficient at prescribed intervals in a core section of a glass optical fiber;

a pair of electrodes formed to sandwich the core section of said optical fiber and protruding from said optical fiber at one or both ends;

a connector section including a pair of concave portions connected to an end of said grating element section for receiving the protruded portion of said pair of electrodes, and a pair of holes for electrical connection between the concave portions and outside; and voltage adjusting means for applying any voltage in an adjustable manner to said pair of electrodes in said grating element section by using said holes for electrical connection in said connector section; wherein light beams of a plurality of wavelengths are introduced to said wavelength selective device to obtain light of a prescribed wavelength.

8. An optical signal transmitting system for transmitting a plurality of optical signals obtained by modulating light beams of a plurality of wavelengths through a single optical fiber, and selecting an optical signal of a prescribed wavelength among a plurality of optical signals transmitted through the optical fiber by an optical wavelength selective device to demodulate the selected optical signal, said optical wavelength selective device including:

a grating element section having a periodically imparted optical non-linearity of at least 1 pm/V as an electro-optic coefficient at prescribed intervals in a core section of a glass optical fiber;

a pair of electrodes formed to sandwich the core section of said optical fiber; and a voltage adjuster constructed and arranged to apply any voltage in an adjustable manner to said pair of electrodes in said grating element section by using said pair of holes for electrical connection, wherein said glass optical fiber defines a pair of holes in a radial direction of said glass fiber adapted to provide an electrical connection to said pair of electrodes, and light beams of a plurality of wavelengths are introduced to said wavelength selective device to obtain light of a prescribed wavelength.

\* \* \* \* \*